(12) United States Patent
Nakakita

(10) Patent No.: US 8,364,735 B2
(45) Date of Patent: Jan. 29, 2013

(54) TEST METHOD OF INTEGRATED CIRCUIT WITH RANDOM-NUMBER GENERATION CIRCUIT AND INTEGRATED CIRCUIT WITH RANDOM-NUMBER GENERATION CIRCUIT

(75) Inventor: Hideaki Nakakita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1114 days.

(21) Appl. No.: 12/252,465

(22) Filed: Oct. 16, 2008

(65) Prior Publication Data

US 2009/0106615 A1    Apr. 23, 2009

(30) Foreign Application Priority Data

Oct. 17, 2007    (JP) ................................. 2007-270602

(51) Int. Cl.
*G06F 7/58*    (2006.01)
*G06F 1/02*    (2006.01)
(52) U.S. Cl. ........................ 708/250; 708/254
(58) Field of Classification Search .................. None
See application file for complete search history.

(56) References Cited

U.S. PATENT DOCUMENTS

| | | | |
|---|---|---|---|
| 6,675,113 B2 * | 1/2004 | Hars | 702/75 |
| 7,472,148 B2 * | 12/2008 | Simon et al. | 708/250 |
| 2004/0098429 A1 * | 5/2004 | Crispin et al. | 708/250 |
| 2008/0052577 A1 * | 2/2008 | Tanaka et al. | 714/728 |

FOREIGN PATENT DOCUMENTS

| | | |
|---|---|---|
| JP | 11-312078 | 11/1999 |
| JP | 2002-268874 | 9/2002 |
| JP | 2003-196081 | 7/2003 |

OTHER PUBLICATIONS

Shinobu Fujita, et al., "Ultrasmall Random Number Generators for High-Level Information Security", Toshiba Review, vol. 58, No. 8, 2003, pp. 47-51.

* cited by examiner

*Primary Examiner* — Lewis A Bullock, Jr.
*Assistant Examiner* — Mark Gooray
(74) *Attorney, Agent, or Firm* — Oblon, Spivak, McClelland, Maier & Neustadt, L.L.P.

(57) ABSTRACT

Random numbers output from a random-number generation circuit, for which an optimized control parameter is set, at a predetermined timing after power-on reset are obtained after each power-on reset, by repeating the power-on reset with respect to a system LSI for a preset number of times, and a test of the obtained predetermined number of random numbers is performed by using a test circuit incorporated in the system LSI to determine the quality of the random-number generation circuit incorporated in the system LSI.

17 Claims, 8 Drawing Sheets

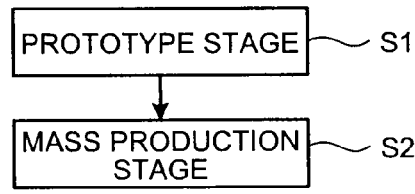
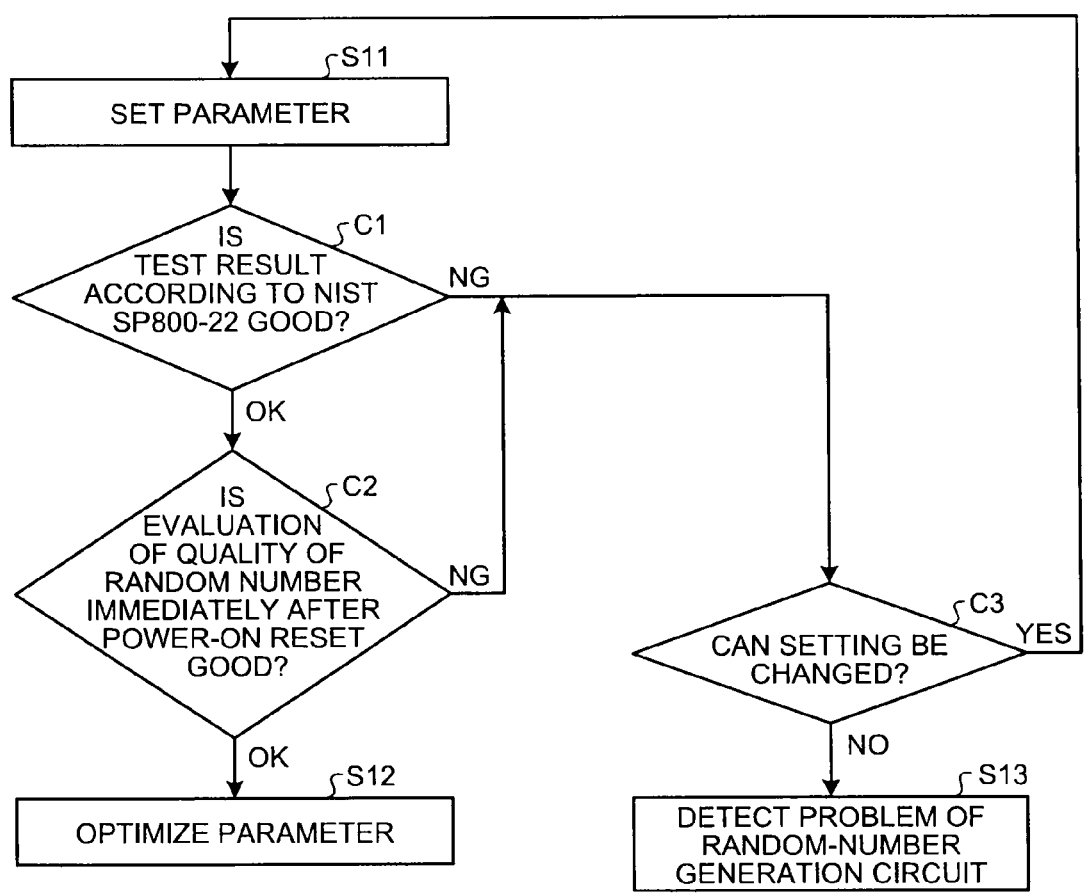

TEST METHOD OF INTEGRATED CIRCUIT WITH RANDOM-NUMBER GENERATION CIRCUIT AND INTEGRATED CIRCUIT WITH RANDOM-NUMBER GENERATION CIRCUIT

CROSS-REFERENCE TO RELATED APPLICATIONS

This application is based upon and claims the benefit of priority from the prior Japanese Patent Application No. 2007-270602, filed on Oct. 17, 2007; the entire contents of which are incorporated herein by reference.

BACKGROUND OF THE INVENTION

1. Field of the Invention

The present invention relates to a test method of an integrated circuit with a random-number generation circuit for testing a random-number generation circuit incorporated in an integrated circuit, and an integrated circuit with a random-number generation circuit.

2. Description of the Related Art

As described on pages 47 to 51 of Toshiba Review Vol. 58, No. 8 (2003), there have been increasing demands for high quality random numbers from an aspect of information security. It is desired to generate a random number that is difficult to predict in the case of communication and recording for encryption and decryption, device authentication, personal authentication, or access control to network. Under such circumstances, in a system LSI (large-scale integration), the random number has been generated by software. However, there have been an increasing number of cases that a random-number generation circuit by hardware is incorporated for a higher randomness. Because random number generation according to the software is based on an arithmetic algorithm, occurrence of periodicity is inevitable, and also occurrence of repeatability is inevitable such that, if the same initial value is provided, the same sequence of random number values is generated. On the other hand, in the random number generation according to the hardware using a physical phenomenon in principle, no periodicity is shown, setting of the initial value is not required, and the sequence of random number values generated after power-on reset will be different after each power-on reset.

In JP-A H11-312078 (KOKAI) and JP-A 2002-268874 (KOKAI), a random-number generation circuit configured by hardware is described. For example, in JP-A H11-312078 (KOKAI), resetting is not performed with respect to a random-number generation circuit configured by a linear feedback shift register (LFSR), so that random number values output from the random-number generation circuit immediately after power on are not the same, without setting the initial value. Further, in JP-A 2002-268874 (KOKAI), there is described a random-number-seed generation circuit that latches an output of a counter operating with a high-speed clock, which is output from an oscillator operating immediately after power on, by a latch circuit that uses a power-on reset signal as a trigger, and uses an output of the latch circuit as a random number seed value (initial value) for the random-number generation circuit. In this case, the count value (random number seed value) latched by the latch circuit is made different every time power is turned on, by using a fact that the power-on reset signal is sufficiently slower than the high-speed clock and an input timing thereof to the latch circuit varies for each time.

Such a random-number generation circuit by the hardware is incorporated in the system LSI after well reviewed in a designing stage. However, because an analog circuit element cannot be completely excluded in incorporation thereof, the random number characteristic may be affected depending on the quality of the random-number generation circuit itself. Therefore, at the time of designing and manufacturing the system LSI on trial, the operation thereof is confirmed by a circuit simulator such as a simulation program with integrated circuit emphasis (SPICE), operation confirmation and evaluation of the quality of the random number are performed by a programmable logic device (PLD) or a field programmable gate array (FPGA), and the quality of the random number needs to be evaluated again in a stage after the system LSI is manufactured. Further, it is desired that the evaluation result of the quality of the random number after the system LSI is manufactured is fed back to thereby enable adjustments of the random-number generation circuit.

Basically, evaluation of the quality of the random number is performed by a statistical test from various angles by obtaining a large amount of data. For example, according to tools published in NIST Special Publication 800-22 (hereinafter, NIST SP800-22) by National Institute of Standards and Technology (NIST), there are more than ten items such as a mono bit test and a poker test. In some of these tests, random number data of 100 million bits or more is required.

To ensure generation of good quality random numbers, all the items in the NIST SP800-22 need to be tested. However, when these tests are performed after the system LSI is manufactured, an actual machine evaluation test using an LSI evaluation board must be performed. If the actual machine evaluation test using the LSI evaluation board is newly added to a mass production process, the cost for the test becomes considerably large, and therefore it is not practical. Thus, under the current circumstances, there has been a strong demand for a method capable of efficiently testing the random-number generation circuit incorporated in the system LSI at a low cost in the mass production stage. To respond to such a demand, it is desired that the random-number generation circuit can be tested concurrently with the existing process without any interruption to it, during the existing process in the mass production stage.

Further, as described above, in random number generation by the software, the initial value needs to be provided after each power-on reset, and when the power is turned off, the random number value generated last needs to be stored as the initial value for the next power-on reset. On the other hand, in the case of the random-number generation circuit by the hardware, generally, such a process for the initial value is not required. This means that there is a strong need to check the quality of the random number sequence of the random-number generation circuit generated immediately after the power-on reset. It can be considered that if there is no problem in the quality of the random number sequence generated immediately after the power-on reset, the quality of the random number sequence subsequent thereto is guaranteed to some extent.

SUMMARY OF THE INVENTION

One aspect of the present invention is to provide a test method of an integrated circuit with a random-number generation circuit. The test method comprises optimizing including testing random numbers output from a random-number generation circuit incorporated in an integrated circuit, while adjusting a control parameter for the random-number generation circuit, and optimizing the control parameter; and determining including repeating power-on reset with respect to the integrated circuit for a preset number of times to obtain predetermined number of random numbers output at a predetermined timing after power-on reset from the random-number generation circuit, for which the optimized control parameter is set, every time power-on reset is performed, testing the obtained predetermined number of random numbers, and determining quality of the random-number generation circuit incorporated in the integrated circuit.

Another aspect of the present invention is to provide an integrated circuit having a random-number generation circuit incorporated therein. The integrated circuit comprises a first terminal that switches the integrated circuit between a normal mode and a test mode; a memory that stores random numbers generated by the random-number generation circuit in the test mode; a second terminal, to which a control parameter for controlling the random-number generation circuit to generate random number values and storing the random number values in the memory, and a test parameter for testing quality of the generated random numbers are input in the test mode, a controller that controls the random-number generation circuit based on the control parameter input from the second terminal in the test mode, and performs control for storing the random number values generated by the random-number generation circuit in the memory based on the test parameter input from the second terminal; a quality determining unit that determines quality of the random-number generation circuit incorporated in the integrated circuit by performing a test of the predetermined number of random numbers stored in the memory based on the test parameter input from the second terminal; and a third terminal that outputs a quality determination result obtained by the quality determining unit, wherein the random number output from the random-number generation circuit at a predetermined timing after power-on reset is stored in the memory after each power-on reset, by repeating the power-on reset with respect to the integrated circuit for a preset number of times, and the quality determining unit tests the stored predetermined number of random numbers.

BRIEF DESCRIPTION OF THE DRAWINGS

FIG. 1 depicts a general LSI production process;
FIG. 2 is a flowchart of an optimization procedure of a control parameter for a random-number generation circuit in a prototype stage.

DETAILED DESCRIPTION OF THE INVENTION

Figure 3:
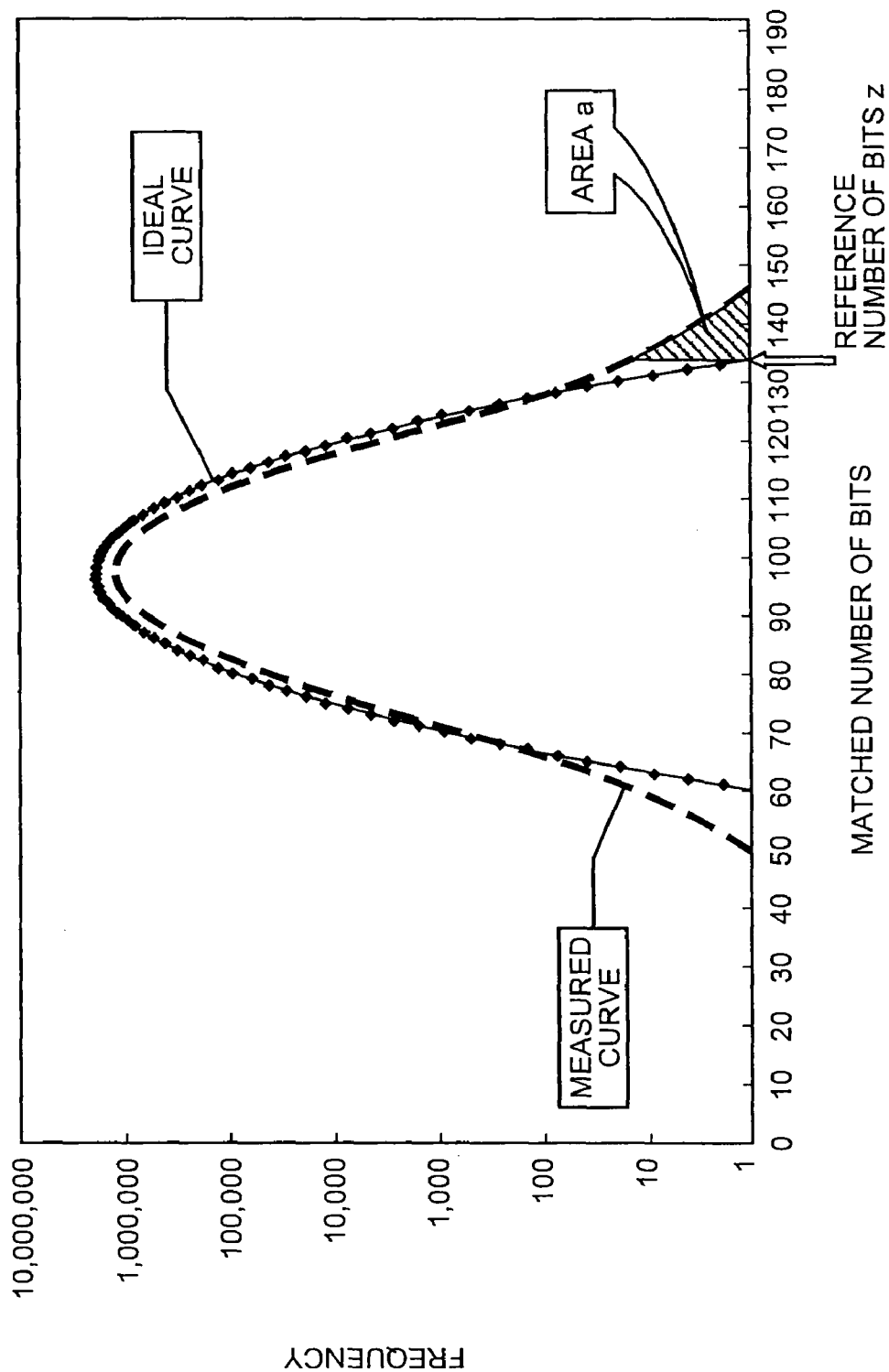
FIG. 3 depicts frequency distribution of matched number of bits in random number sequences.

Exemplary embodiments of a test method of an integrated circuit with a random-number generation circuit and an integrated circuit with a random-number generation circuit according to the present invention will be explained below in detail with reference to the accompanying drawings.

FIG. 1 depicts a production process of a general system LSI. In a prototype stage (S1), control parameters of the system LSI are optimized. In a mass production stage (S2), the system LSIs are shipped when having passed various tests using the optimized control parameters. The system LSI having the random-number generation circuit incorporated therein undergoes such a process. Therefore, in a first embodiment of the present invention, in the prototype stage (S1), the random numbers output from the random-number generation circuit in the system LSI are tested to optimize the control parameters, while adjusting the control parameters of the random-number generation circuit. In the mass production stage (S2), the power-on reset with respect to the system LSI is repeated for a preset number of times m, to obtain a random number bit sequence immediately after the power-on reset, which is output after each power-on reset from the random-number generation circuit for which the optimized control parameters are set. The obtained preset number (m) of random number bit sequences generated immediately after the power-on reset are tested, to determine the quality of the random-number generation circuit incorporated in the system LSI.

FIG. 2 is an example of an optimization procedure of the control parameter for the random-number generation circuit in the system LSI, which is executed in the prototype stage (S1) shown in FIG. 1. In FIG. 2, firstly at a parameter setting step (S11), the control parameter for the random-number generation circuit is set to a value expected to be optimum. After this setting, a test using such as a method specified in the NIST SP800-22 (more than ten items such as a mono bit test and a poker test) is executed in the actual machine evaluation test using the LSI evaluation board (C1). Specifically, after the power-on reset, random numbers are generated for a predetermined number of times, and the test using the method specified in the NIST SP800-22 is executed with respect to a predetermined number of sets of time series random number values. The predetermined number is determined by designating the number of bits (1 million bits) at which the test result of the NIST SP800-22 becomes significant. For example, in the case of 192-bit random numbers, at least 5,209 random numbers are required.

If the test result according to the NIST SP800-22 at step C1 is not good (hereinafter, "NG"), it is then determined whether the control parameter for the random-number generation circuit can be changed (C3), and when the control parameter can be changed, the control parameter for the random-number generation circuit is reset to other value (S11). If the test result according to the NIST SP800-22 at step C1 is good (hereinafter, "OK"), the quality of the random number generated immediately after the power-on reset is evaluated (C2). In the evaluation at C2, the power-on reset is repeated for a predetermined number of times, to obtain a random number sequence immediately after the power-on reset after each power-on reset, and evaluates the quality of the random number sequence. If the evaluation result at C2 is NG, it is then determined whether the control parameter for the random-number generation circuit can be changed (C3), and when the control parameter can be changed, the control parameter for the random-number generation circuit is reset (S11). If the evaluation result at C2 is OK, optimization of the control parameter for the random-number generation circuit is complete (S12). Even after the control parameter is changed, if the results of the test C1 and the evaluation C2 are NG, it is determined that there is a problem in the random-number generation circuit incorporated in the system LSI (S13). In this case, design of the random-number generation circuit is reviewed. The order of C1 and C2 can be replaced.

In the quality evaluation of the random number generated immediately after the power-on reset at step C2, for the generated predetermined number of sets of random number sequences generated immediately after the power-on reset, for example, arbitrary two random number sequences are compared at each bit position (the same bit position) and number of bits matching each other (matched number of bits) is detected. This process is performed with respect to two random number sequences in a round-robin fashion, to detect frequency distribution of the matched number of bits.

FIG. 3 depicts the frequency distribution of the matched number of bits, which is a relation between the matched number of bits and the frequency. In FIG. 3, in the case of a complete natural random number shown by solid line, the distribution thereof becomes a binomial distribution curve like an ideal curve. This curve is based on following calculating formula. In comparison at respective bit positions, a combination of (0, 0) and (1, 1) is determined as a matched combination and a combination of (0, 1) and (1, 0) is determined as a mismatch. Therefore, matching probability is ½. The probability when the number of bits of the random number is n and the matched number of bits is k is calculated as follows.

$$_nC_k \times (½)^k (½)^{n-k} \quad (1)$$

When it is assumed that the predetermined number (the number of repetition of power-on reset) is m, the number of combinations of the arbitrary two random number sequences is $_mC_2$. As a result, the ideal frequency of the matched number of bits is calculated as follows.

$$_nC_k \times (½)^n \times _mC_2 \quad (2)$$

When a measured curve as shown by dotted line in FIG. 3 is obtained with respect to the binomial distribution curve, several determination criteria for the quality of the random number can be considered. Basically, the height of the frequency on the side increasing the matched number of bits is a reference to consider. In the case of m=8000 in the 192-bit random number sequence (n=192):

(a) in a first determination criterion, a deviation of the measured curve from the ideal curve is detected in a region where the matched number of bits (reference number of bits z) is 134 or larger, at which the frequency thereof is less than 1 in the ideal curve, and when the deviation is large, it is determined that the quality is poor. For example, when a difference (area a) between the measured curve and the ideal curve in a region equal to or larger than the reference number of bits z exceeds a predetermined threshold, it is determined that the quality of the random number is poor. The matched number of bits having a larger value than the center of the distribution is selected from a matched bit-number group having a frequency of 1 or less in the ideal frequency distribution, and the matched number of bits having the smallest value among the selected matched number of bits is designated as the reference number of bits z.

(b) in a second determination criterion, it is determined that the quality of the random number is poor when the frequency of the matched number of bits equal to or larger than the reference number of bits z exceeds a predetermined value; and (c) in a third determination criterion, predetermined number of bits larger than the reference number of bits z is set as a threshold, and when the frequency of the matched number of bits larger than the threshold is equal to or larger than 1, it is determined that the quality of the random number is poor.

Figure 4:
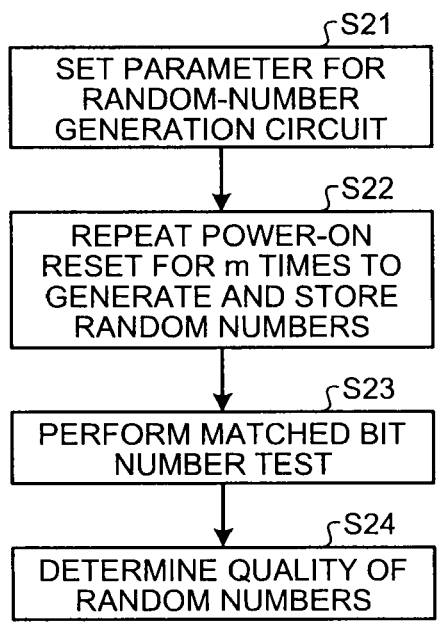
FIG. 4 is a flowchart of a random-number-quality evaluation procedure immediately after power-on reset.

FIG. 4 depicts a detailed random-number-quality evaluation procedure according to the matched number of bits, executed at step C2 shown in FIG. 2. At first, the control parameters for operating the random-number generation circuit and test parameters for testing the random-number generation circuit are set (S21). The number of repetition m of the power-on reset is then selected. The number of repetition m is basically determined to match the customer-requested quality (the quality of the random number required by an application realized by using the system LSI). For example, when the number of power-on resets is set to 20 times per day, and when it is determined as a reference that the same value does not appear for 400 days, m=8,000. The power-on reset is repeated for the number of times m, to generate random numbers, and the generated random numbers are stored in a memory (a nonvolatile memory or a static random access memory (SRAM)) incorporated in the system LSI. The matched bit number test is executed with respect to the m random number values generated immediately after the power-on reset stored in the memory (S23). When having passed the test, the random number is determined to have good quality (S24). Time required for storing the random numbers at step S22 is 40,000 seconds in the case of m=8,000, by performing the power-on reset for example, with a 5 second interval.

Figure 5:
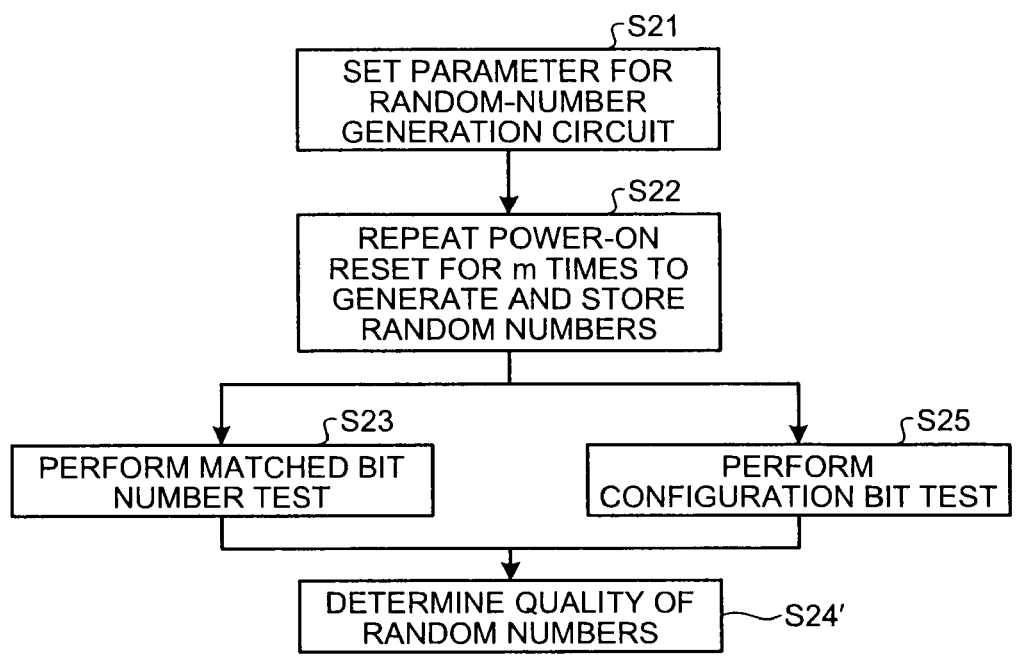
FIG. 5 is a flowchart of another random-number-quality evaluation procedure immediately after power-on reset.

FIG. 5 depicts another method for evaluating the quality of the random numbers generated immediately after the power-on reset, performed at Step C2 shown in FIG. 2. In the case of FIG. 5, a configuration bit test is executed in addition to the matched bit number test explained above with reference to FIG. 3 (S25). In the configuration bit test, the number of "0" or "1" appearing at the same bit position is calculated, with respect to the m random number values generated immediately after the power-on reset obtained by repeating the power-on reset for m times, and when the calculated value is not within a predetermined fluctuation range α, it is determined that the quality of the random number is poor. That is, in the case of a natural random number, probability of occurrence of "1" and "0" is respectively 50%. Therefore, it is determined that the quality of the random number is poor, when the number of "0" or "1" is, for example, not within a range of from (m/2−α) to (m/2+α). For example, when a check bit is an odd bit, the number of "0" or "1" is respectively counted for the m-bit random numbers of the odd bits, and when the counted value is not within the range of from (m/2−α) to (m/2+α), it is determined that the quality of the random number is poor. For the check bits, all the bits can be checked, or only even bits or fewer bits can be checked.

At step S24' in FIG. 5, the quality of the random numbers of the random-number generation circuit is determined based on the test results of the matched bit number test and the configuration bit test. For example, if the quality of the random number does not pass the both tests, it is determined that the quality of the random number is poor. In FIG. 5, the matched bit number test and the configuration bit test are concurrently executed, and therefore the quality of the random number is evaluated from two aspects. At step C2 shown in FIG. 2, only one of the matched bit number test and the configuration bit test can be performed.

In the prototype stage (S1) in FIG. 1, the NIST SP800-22 test (C1) is performed, and at least one of the matched bit number test and the configuration bit test with respect to the m random number values generated immediately after the power-on reset obtained by repeating the power-on reset is performed. However, any type of arbitrary test can be performed, so long as the test can optimize the control parameter for the random-number generation circuit.

The above explanation relates to the optimization procedure of the control parameter for the random-number generation circuit in the prototype stage (S1) in FIG. 1. A method for evaluating the random-number generation circuit in the system LSI in the mass production stage (S2) in FIG. 1, and a test circuit therefore are explained next. In the mass production stage (S2), quality evaluation of the random numbers generated immediately after the power-on reset explained with reference FIG. 4 or 5 is executed with respect to the system LSI having the random-number generation circuit incorporated therein, for which the optimized control parameter is set. That is, the power-on reset is repeated with respect to the system LSI for the preset number of times m, to obtain the random number bit sequence immediately after the power-on reset, which is output after each power-on reset from the random-number generation circuit for which the optimized control parameter is set. At least one of the matched bit number test and the configuration bit test are then performed with respect to the obtained predetermined number (m) of random number bit sequences immediately after the power-on reset, to determine the quality of the random-number generation circuit incorporated in the system LSI.

Figure 6:
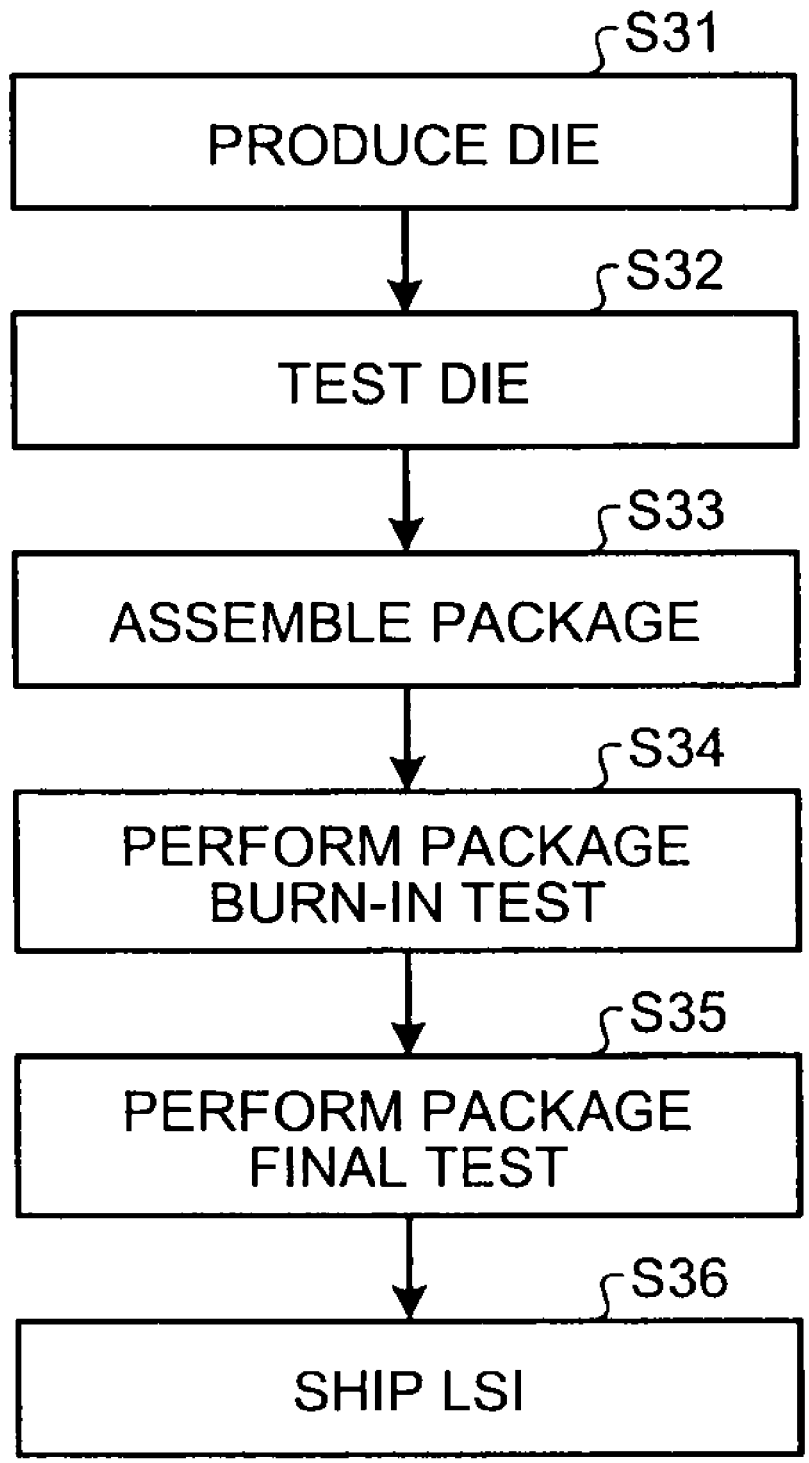
FIG. 6 depicts an LSI production process in a general mass production stage.

FIG. 6 depicts an LSI production process in the general mass production stage (S2). In the mass production stage (S2), the LSI undergoes five steps of die manufacturing (S31), a die test (S32), package assembly (S33), a package burn-in test (S34), and a package final test (S35), and the LSI is shipped (S36). In the test of the random-number generation circuit in the mass production stage (S2), the power-on reset is repeated for the predetermined number of times m, to obtain the random number generated immediately thereafter. Therefore, long time is required only for that. Accordingly, if the test of the random-number generation circuit is included in the package burn-in test, which requires long time in the current state, evaluation of the random-number generation circuit can be executed, while suppressing the additional test cost, thereby enabling to manufacture the system LSI efficiently.

Figure 7:
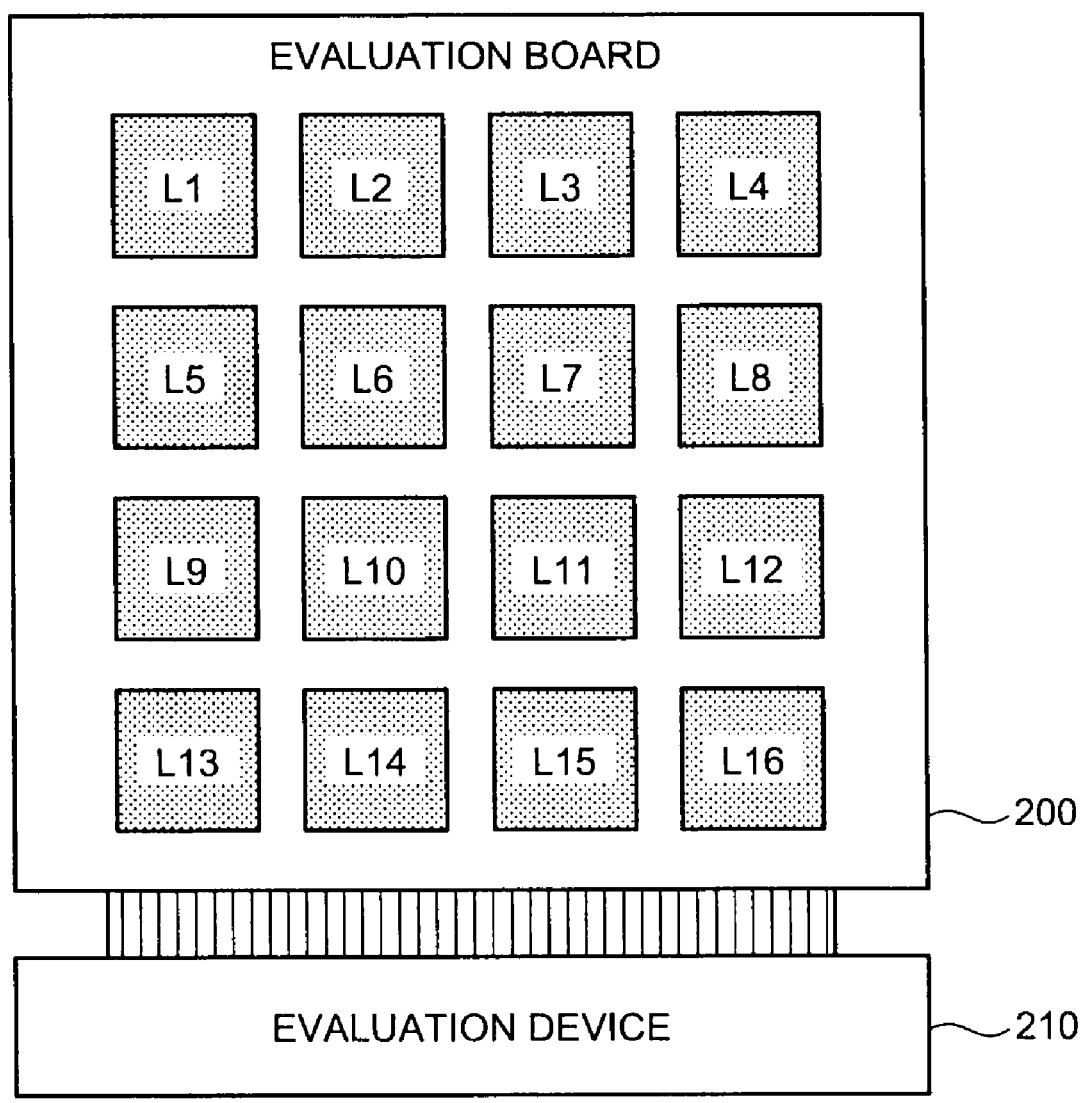
FIG. 7 depicts a state of a package burn-in test.

FIG. 7 depicts a state of the general package burn-in test. On the evaluation board 200, a plurality of package assembled system LSIs are mounted, and an evaluation device 210 controls the package burn-in test. In the case of FIG. 7, 16 system LSIs L1 to L16 are mounted on the evaluation board 200. The object of the burn-in test is to operate the system LSIs L1 to L16 arranged on the evaluation board 200 for long time in a high-temperature and high-voltage environment, to thereby prevent shipment of initial defective products. Thus, in the burn-in test, because many LSIs are tested simultaneously, the number of input/output terminals per one LSI that can be connected to the evaluation device 210 is limited.

Figure 8:
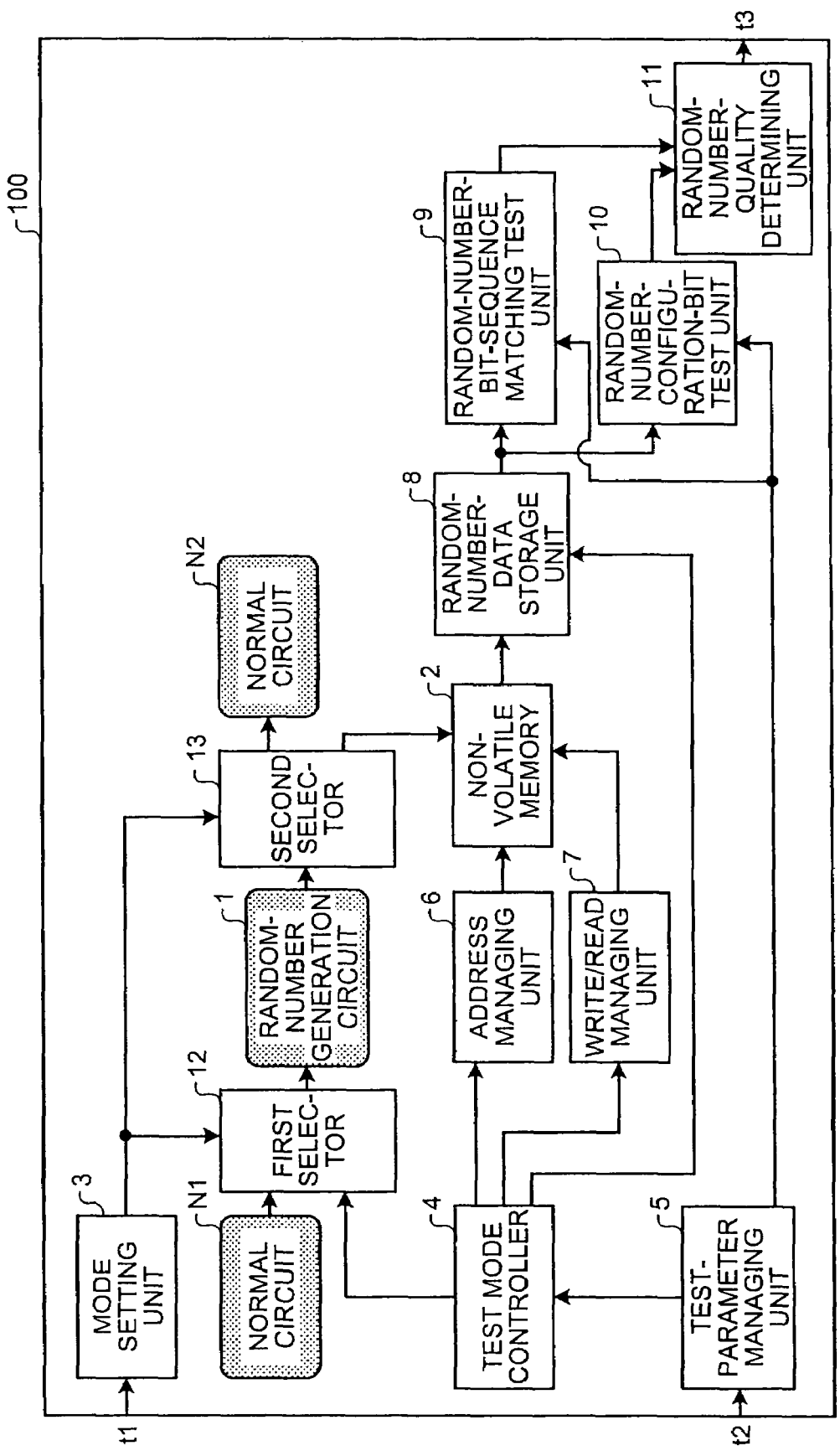
FIG. 8 is a block diagram of an internal circuit configuration example of a system LSI according to a first embodiment of the present invention having a test circuit incorporated therein.

FIG. 8 is an internal circuit configuration example of the system LSI 100 having a test circuit incorporated therein for performing the matched bit number test and the configuration bit test explained with reference to FIG. 5. In FIG. 8, only a portion related to the random-number generation circuit is shown. In the system LSI 100 shown in FIG. 8, a test circuit for the random-number generation circuit is incorporated in the system LSI, and therefore not only the control parameters for the random-number generation circuit can be optimized according to the flow shown in FIG. 2 under various conditions in the prototype stage (S1), but also in the mass production stage (S2), integrity of the random-number generation circuit is evaluated to select the system LSI.

In FIG. 8, a random-number generation circuit 1 starts an operation after the power-on reset is released to generate random numbers, and is expected to generate different random numbers (random number bit sequences) after each power-on reset. In this case, the random-number generation circuit 1 generates the random numbers without using a seed value. Normal circuits N1 and N2 operate in a normal operation mode of the system LSI 100. In FIG. 8, therefore, a circuit configuration other than the random-number generation circuit 1, the normal circuits N1 and N2 is a test circuit for random-number generation circuit, which operates in a test mode of the random-number generation circuit. The test circuit for the random-number generation circuit includes a nonvolatile memory 2, a mode setting unit 3, a test mode controller 4, a test-parameter managing unit 5, an address managing unit 6, a write/read managing unit 7, a random-number-data storage unit 8, a random-number-bit-sequence matching test unit 9, a random-number-configuration-bit test unit 10, a random-number-quality determining unit 11, a first selector 12, and a second selector 13. The system LSI 100 includes terminals t1, t2, and t3 to be used in the test mode.

A mode switching signal for switching the test mode and the normal operation mode is input to the terminal t1. The mode switching signal input is input to the mode setting unit 3. A setting output of the mode setting unit 3 is input to the first selector 12 and the second selector 13. When the mode setting unit 3 is set to the normal operation mode, the first selector 12 selects an output of the normal circuit N1 to input the output to the random-number generation circuit 1, and when the mode setting unit 3 is set to the test mode, the first selector 12 selects an output of the test mode controller 4 to input the output to the random-number generation circuit 1. When the mode setting unit 3 is set to the normal operation mode, the second selector 13 connects the output of the random-number generation circuit 1 to the normal circuit N2, and when the mode setting unit 3 is set to the test mode, the second selector 13 connects the output of the random-number generation circuit 1 to the nonvolatile memory 2. Although not shown in FIG. 8, the setting output of the mode setting unit 3 is input to the nonvolatile memory 2, the test mode controller 4, the test-parameter managing unit 5, the address managing unit 6, the write/read managing unit 7, the random-number-data storage unit 8, the random-number-bit-sequence matching test unit 9, the random-number-configuration-bit test unit 10, and the random-number-quality determining unit 11. These respective circuits are effective when the setting output of the mode setting unit 3 is in the test mode.

The control parameters for the random-number generation circuit 1 and the test parameters to be used for the random number test are input to the terminal t2. These control parameters and the test parameters are set in the test-parameter managing unit 5.

Figure 9:
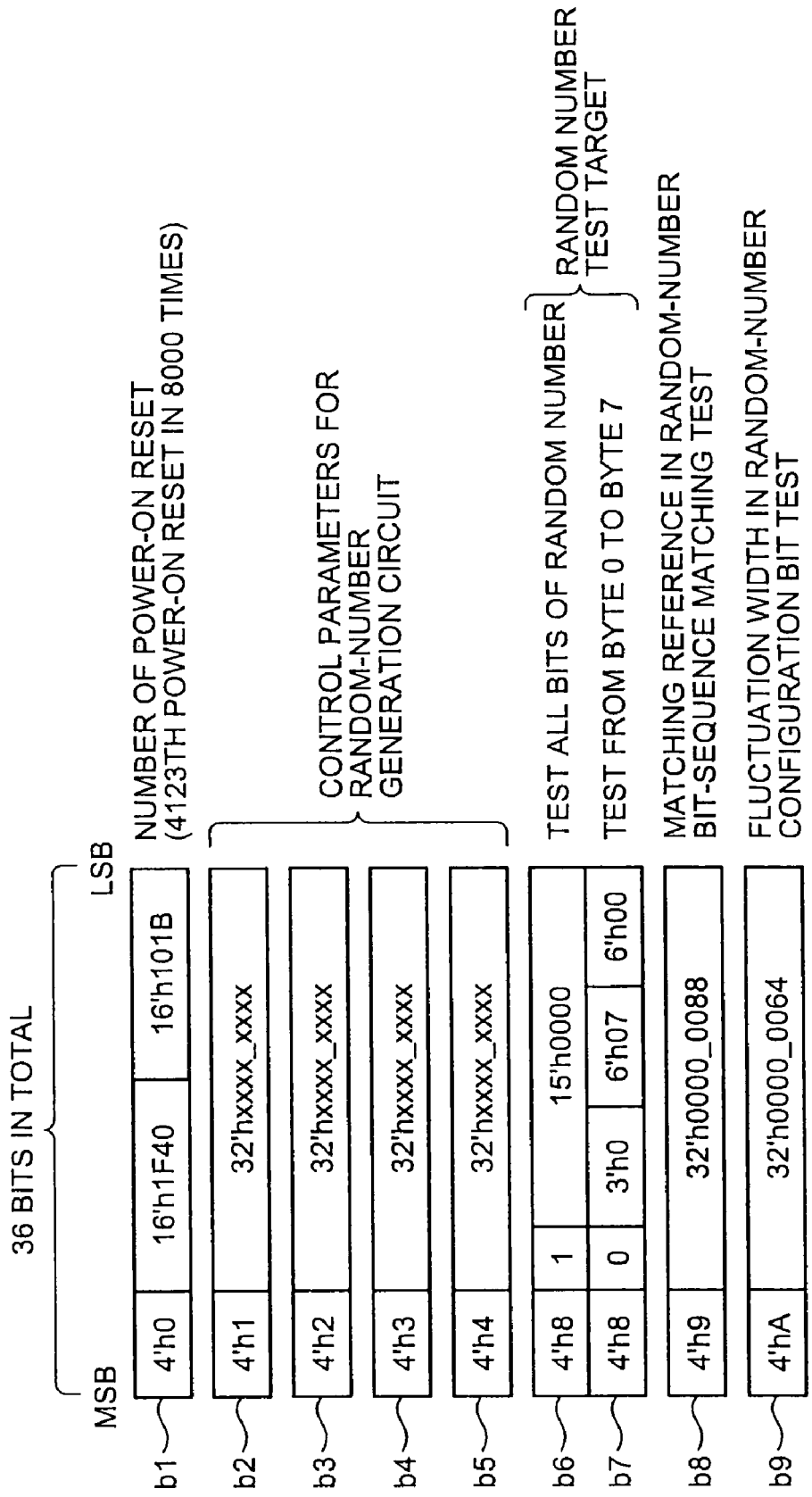
FIG. 9 depicts a format of control parameters and test parameters input to a terminal.

FIG. 9 is one example of the control parameters and the test parameters input to the terminal t2. In this case, the terminal t2 has at least 37 bits, and one bit of the 37 bits indicates an input effective period on the residual 36 bits expressing the control parameters or the test parameters, which are input to the system LSI 100. Four bits on the most significant bit (MSB) side set information type, and low-order 32 bits set the parameters. Parameters shown in b1, b6 to b9 are the test parameters, and parameters shown in b2 to b5 are the control parameters.

For example, as shown in b1, when four bits on the MSB side are zero (4'h0) in a hexadecimal notation, the low-order 32 bits indicate the number of repetition m of the power-on reset and the currently repeated number. In the case of FIG. 9, the number of repetition m is 8,000 (16'h1F40), and the currently repeated number is 4,123 (16'h101B).

In the case of FIG. 9, the control parameters for the random-number generation circuit 1 are expressed by four 32-bit registers, and four bits on the MSB side are allocated to 4'h1 to 4'h4 (b2 to b5). The number of registers increases or decreases according to design of the random-number generation circuit 1. When the number of the control parameters is larger than four 32-bit registers, further allocation is required. If the number thereof is smaller than four, the allocation can be reduced. These control parameters are set to optimum values according to the actual machine evaluation in the prototype stage before the mass production process. In the system LSI, a control register having a specific bit width (for example, 32-bit width) is generally prepared, and therefore the control parameters are expressed with the specific bit width.

As shown in b6 and b7, low-order 32-bit parameters when the four bits on the MSB side are 4'h8 specify which part of the random number is to be tested. That is, the determination criteria can be divided whether to test all the bits or to test a part thereof, for the random number generated by the random-number generation circuit 1. For example, when 160-bit random numbers are generated, if there is no theoretical problem as the configuration of the random-number generation circuit 1 even if the random number is partially tested, it is considered to test not all the bits but only the least significant 32 bits. In FIG. 9, for example, when the MSB in the low-order 32-bit field is "1", it is specified that all the bits are to be tested (b6). When the bit is "0", it is specified that a partial area is to be tested, where a continuous area from a byte position specified by the low-order 6 bit [5:0] field to a byte position specified by 6-bit [11:6] field subsequent to the low-order 6 bits is to be tested. In the example of b7, 8 bytes (64 bits) in total from byte 0 to byte 7 are a test target. The number of bits specified by b6 or b7 becomes the number of bits n to be compared.

As shown in 8, matching criteria (first to third determination criteria) in the random-number bit-sequence matching test explained with reference to FIG. 3 are set in the low-order 32-bit parameters when the four bits on the MSB side is 4'h9. In the case of b8 shown in FIG. 9, a threshold d to be used in the third determination criterion is set. As described above, in the third determination criterion, a predetermined number of bits larger than the reference number of bits z is designated as the threshold d, and it is determined that the quality of the random number is poor when the frequency of the matched number of bits larger than the threshold d is equal to or larger than 1. According to the ideal curve shown in FIG. 3, for example, when m=8000 and n=192, the frequency of the matched number of bits being 134 or larger is zero. Therefore, the parameter of b8 are set to a predetermined number d=136 ('h88), which is equal to or larger than 134.

As shown in b9, an allowable fluctuation width ($\alpha$) in the random-number configuration bit test explained at S25 in FIG. 5 is set in the low-order 32-bit parameter when the four bits on the MSB side is 4'hA. That is, when the number of occurrence of "0" (or "1") in the random number bit sequence is outside the range of from (m/2−$\alpha$) to (m/2+$\alpha$), it is determined that the quality of the random number is poor. In the example of FIG. 9, $\alpha$ is set to 100 ('h64).

The control parameters and the test parameters as shown in FIG. 9 are set to the test-parameter managing unit 5 via the terminal t2, and the test-parameter managing unit 5 inputs the control parameters in b2 to b5 and the test parameters in b1, b6, and b7, of the set control parameters and test parameters, to the test mode controller 4. Further, the test-parameter managing unit 5 inputs the matching criteria in b8 in the random-number bit-sequence matching test to the random-number-bit-sequence matching test unit 9. Further, the test-parameter managing unit 5 inputs the number of repetition m of the power-on reset in b1 and the fluctuation width $\alpha$ in the random-number configuration bit test in b9 to the random-number-configuration-bit test unit 10.

The test mode controller 4 inputs the input control parameters (b2 to b5 in FIG. 9) to the random-number generation circuit 1 via the first selector 12 in the test mode, to control a random number generation operation of the random-number generation circuit 1. The test mode controller 4 further determines a write address and write timing with respect to the nonvolatile memory 2, based on the number of bytes n (b6 and b7 in FIG. 9) of the random number to be tested and the number of power-on resets m (b1 in FIG. 9) among the input test parameters, and inputs the determined write address to the address managing unit 6 and the determined write timing to the write/read managing unit 7. The address managing unit 6 uses the input write address to determine an address signal at the time of write or read, to be applied to the nonvolatile memory 2. The write/read managing unit 7 uses the input write timing to determine the timing of a write signal to be applied to the nonvolatile memory 2.

The nonvolatile memory 2 can store storage contents even if power is turned off, and stores the random number sequence generated immediately after the power-on reset from the random-number generation circuit 1 input via the second selector 13 in a predetermined memory area, according to the write signal from the write/read managing unit 7 and the address signal from the address managing unit 6. The random number sequence stored in the nonvolatile memory 2 is read out according to the read signal from the write/read managing unit 7 and the address signal from the address managing unit 6, and stored in the random-number-data storage unit 8 under control of the test mode controller 4. Storage of the random number sequence from the nonvolatile memory 2 to the random-number-data storage unit 8 is performed after power-on resets have finished for m times. In this manner, the random-number-data storage unit 8 stores m random number sequences obtained by m power-on resets.

The random-number-bit-sequence matching test unit 9 performs a process, in which arbitrary two random number sequences are compared at each bit position (the same bit position) and number of bits matching each other (matched number of bits) is detected, with respect to two random number sequences in a round-robin fashion, for the m sets of the random number sequences generated immediately after the power-on resets read from the random-number-data storage unit 8, to check the frequency distribution of the matched number of bits. In this case, the threshold d to be used in the third determination criterion is set as the matching reference parameter b8 from the terminal t2, and the random-number-bit-sequence matching test unit 9 uses a predetermined number of bits larger than the reference number of bits z as the threshold d, to determine that the quality of the random number is poor, when the frequency of the matched number of bits larger than the threshold d is equal to or larger than 1.

The random-number-configuration-bit test unit 10 executes the random-number configuration bit test explained at S25 in FIG. 5. That is, the random-number-configuration-bit test unit 10 counts the number of "0" or "1" appearing at the same bit position with respect to the m random number values generated immediately after the power-on reset obtained by repeating the power-on reset for m times, and when the counted value is not within the predetermined fluctuation range $\alpha$, the quality of the random number is determined to be poor.

The random-number-quality determining unit 11 determines the acceptance of the random-number generation circuit 1 incorporated in the system LSI based on the test result of the random-number-bit-sequence matching test unit 9 and the test result of the random-number-configuration-bit test unit 10, and outputs the acceptance determination result from the terminal t3 as a 1-bit binary output. When the test result of the random-number-bit-sequence matching test unit 9 and the test result of the random-number-configuration-bit test unit 10 indicate pass, the random-number-quality determining unit 11 determines that the random-number generation circuit 1 incorporated in the system LSI has passed the tests. Otherwise, the random-number-quality determining unit 11 determines that the random-number generation circuit 1 has not passed the tests. By connecting the output from the terminal t3 to an appropriate display unit, the quality of the random-number generation circuit 1 can be indicated by OK or NG.

An operation at the time of performing the test of the random-number generation circuit 1 concurrently with the burn-in test by mounting a plurality of system LSIs 100 shown in FIG. 8 on the evaluation board 200 in the burn-in test apparatus shown in FIG. 7 is explained. A power supply line of each system LSI 100 is connected to the evaluation device 210, and each system LSI 100 executes a plurality of power-on resets under control of the evaluation device 210. The terminals t1 to t3 of each system LSI 100 are also connected to the evaluation device 210. The mode switching signal for switching each system LSI 100 to test mode is input to the terminal t1 of each system LSI 100, and the control parameters for the random-number generation circuit 1 optimized in the prototype stage and the test parameters to be used for the random number test are input to the terminal t2. The acceptance test result of each system LSI 100 output from the terminal t3 is individually displayed on the appropriate display unit of the evaluation device 210.

When the first power-on reset is executed by the evaluation device 210, after the power-on reset, the test mode controller 4 inputs the control parameters (b2 to b5 in FIG. 9) received from the test-parameter managing unit 5 to the random-number generation circuit 1 via the first selector 12. Accordingly, the random-number generation circuit 1 starts up according to the input control parameters, to generate the random number sequence. Further, the test mode controller 4 inputs the various test parameters received from the test-parameter managing unit 5 (b1, and b6 to b9 in FIG. 9) to a required circuit unit. The random number sequence generated by the random-number generation circuit 1 is written in the nonvolatile memory 2 via the second selector 13 under control of the address managing unit 6 and the write/read managing unit 7. When predetermined time has passed from the first power-on reset, the second power-on reset is executed by the evaluation device 210, and in the same manner as in the first time, the random number sequence generated by the random-number generation circuit 1 is written in the nonvolatile memory 2. Because the power-on reset in which such a process is set is executed for the predetermined number of repetitions m, m random number sequences generated immediately after the power-on reset are stored in the nonvolatile memory 2.

Thereafter, the m random number sequences stored in the nonvolatile memory 2 are stored in the random-number-data storage unit 8. The random-number-bit-sequence matching test unit 9 uses the m random number sequences stored in the random-number-data storage unit 8 to obtain the frequency distribution of the matched number of bits, and uses the frequency distribution to determine the acceptance of the random-number generation circuit 1. The random-number-configuration-bit test unit 10 also uses the m random number sequences stored in the random-number-data storage unit 8 to perform the random-number configuration bit test, to determine the acceptance of the random-number generation circuit 1. The random-number-quality determining unit 11 determines the acceptance of the quality of the random-number generation circuit 1 incorporated in the system LSI 100, based on the test result of the random-number-bit-sequence matching test unit 9 and the test result of the random-number-configuration-bit test unit 10, and outputs the acceptance determination result as a 1-bit binary output from the terminal t3. The acceptance determination result of the quality of the random-number generation circuit 1 is output from each terminal t3 of each system LSI 100 arranged on the evaluation board 200 in this manner, and displayed for each system LSI on the appropriate display unit of the evaluation device 210.

According to the first embodiment, in the prototype stage (S1), the test of the random number output from the random-number generation circuit 1 in the system LSI 100 is performed, while adjusting the control parameters for the random-number generation circuit, to optimize the control parameters. In the mass production stage (S2), the power-on reset is repeated for the preset number of times m with respect to the system LSI 100, to obtain the random number bit sequence generated immediately after the power-on reset output after each power-on reset from the random-number generation circuit 1, for which the optimized control parameters are set. The test of the obtained m random number bit sequences generated immediately after the power-on resets is executed, to determine the quality of the random-number generation circuit incorporated in the system LSI. Accordingly, the random-number generation circuit incorporated in the system LSI can be efficiently tested in the mass production stage at a low cost, and occurrence of initial defects can be prevented.

Further, according to the first embodiment, the random number value generated by the random-number generation circuit incorporated in the system LSI is tested by the test circuit incorporated in the system LSI, immediately after the power-on reset every time the power-on reset is performed, to determine the acceptance thereof, and the acceptance determination result is output from the terminal. Accordingly, application to an existing burn-in step in the mass production stage is facilitated, thereby enabling to evaluate the random-number generation circuit incorporated in the system LSI efficiently at a low cost, and occurrence of initial defects can be prevented.

Further, the test parameters shown in b1, and b6 to b9 in FIG. 9 are input from an external terminal. Therefore, by changing the test parameters corresponding to the required quality of the random number, the test criteria and the determination criteria in the test in the mass production stage can be adjusted.

The parameters other than the predetermined number m of power-on resets are provided only at the time of the first power-on reset. At this time, the parameters can be stored in the nonvolatile memory. In this case, when obtaining the random number value after the second power-on reset and thereafter, the random-number generation circuit or the like are operated based on the parameters stored in the nonvolatile memory.

While the terminal t2 includes 37 terminals in the above explanations, the terminal t2 can be formed of two terminals in such a manner that the 36-bit information is input serially by one terminal, and the other terminal shows the input effective period of the information. If such a serial input is used, the number of terminals required for the test can be reduced, thereby enabling to increase the number of LSIs to be mounted on the evaluation board for the package burn-in test as shown in FIG. 7. This has an advantage that the package burn-in test period can be reduced.

Further, the matched bit number test and the configuration bit test are performed in the mass production step. However, any one of these two tests can be performed, or other arbitrary tests such as a periodicity test of the random number can be performed.

Figure 10:
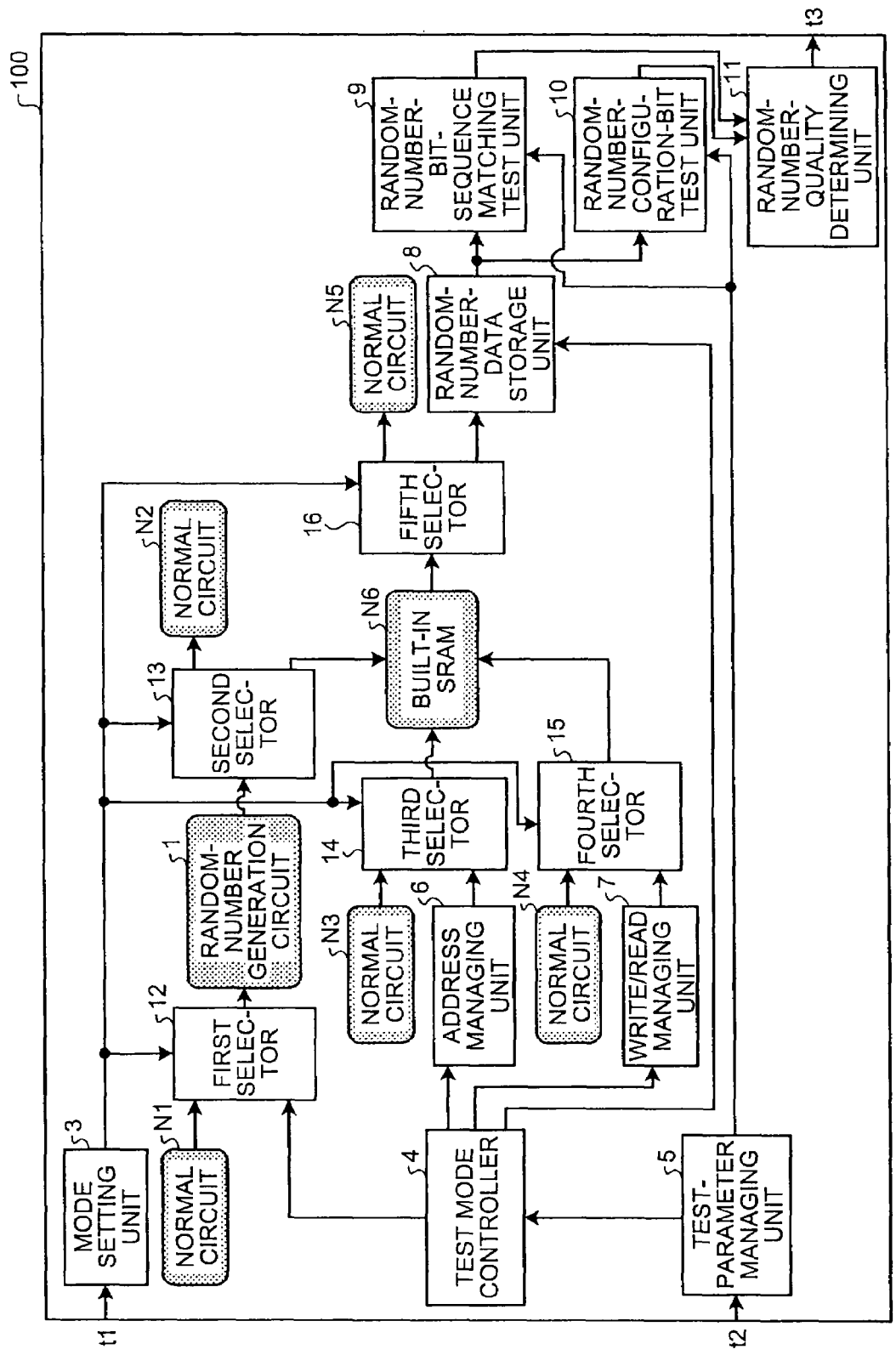
FIG. 10 is a block diagram of an internal circuit configuration example of a system LSI according to a second embodiment of the present invention having a test circuit incorporated therein.

A second embodiment of the present invention is explained next. FIG. 10 is another configuration example of the system LSI 100 shown in FIG. 8. In the system LSI 100 shown in FIG. 10, a built-in SRAM N6 normally included in the system LSI is used instead of the nonvolatile memory 2 shown in FIG. 8. The built-in SRAM N6 is used in the normal mode of the system LSI, and is also used for the test of the random-number generation circuit.

In FIG. 10, a third selector 14 executes a switching operation such that when the mode setting unit 3 is set to the normal operation mode, the third selector 14 selects an output of a normal circuit N3 and inputs the output to the built-in SRAM N6, and when the mode setting unit 3 is set to the test mode, selects an output of the address managing unit 6 and inputs the output to the built-in SRAM N6. A fourth selector 15 executes a switching operation such that when the mode setting unit 3 is set to the normal operation mode, the fourth selector 15 selects an output of a normal circuit N4 and inputs the output to the built-in SRAM N6, and when the mode setting unit 3 is set to the test mode, selects an output of the write/read managing unit 7 and inputs the output to the built-in SRAM N6. A fifth selector 16 executes a switching operation such that when the mode setting unit 3 is set to the normal operation mode, the fifth selector 16 inputs an output of the built-in SRAM N6 to a normal circuit N5, and when the mode setting unit 3 is set to the test mode, inputs the output of the built-in SRAM N6 to the random-number-data storage unit 8. In FIG. 10, other constituent elements have the same functions as those shown in FIG. 8, and therefore redundant explanations thereof will be omitted.

In the system LSI shown in FIG. 8, the nonvolatile memory 2 needs to be prepared only for the test of the random-number generation circuit. However, in the system LSI shown in FIG. 10, the nonvolatile memory 2 is not required. This can lead to omission of, for example, a production step for assembling a mask ROM in the production process of the LSI, thereby enabling to reduce the production cost. However, a power supply for the built-in SRAM N6 needs to be a separate system from other circuits. This is for the built-in SRAM N6 to hold all the m random numbers generated immediately after the power-on reset even if the power-on reset is repeated, so that the storage content of the SRAM is not lost due to the power-on reset. Therefore, during the test period of the random-number generation circuit, the power is supplied to the built-in SRAM N6 at all times.

In the first and second embodiments, the power-on reset is repeated for m times to obtain m random numbers generated immediately after the power-on reset, and the test of the random numbers is performed by using the m random numbers generated immediately after the power-on resets. However, in the present invention, random numbers generated at a predetermined timing after the power-on reset can be obtained. For example, in the case of a random-number generation circuit that periodically generates a plurality of random number sequences, the random number sequence generated in the preset ith period can be obtained after each power-on reset, or a random number sequence generated after preset fixed clocks after the power-on reset can be obtained every time the power-on reset is executed.

According to the present invention, the random-number generation circuit to be incorporated in an integrated circuit can be efficiently tested in the mass production stage at a low cost, and occurrence of initial defects can be prevented.

Further, according to the present invention, the random number values generated by the random-number generation circuit incorporated in the integrated circuit after the power-on reset are tested by a test circuit incorporated in the integrated circuit after each power-on reset, to determine the acceptance thereof, and outputs the acceptance determination result from the terminals. Therefore, application to an existing step in the mass production stage is facilitated, thereby enabling to evaluate the random-number generation circuit incorporated in the integrated circuit efficiently at a low cost, and to prevent occurrence of initial defects.

What is claimed is:

1. A test method of an integrated circuit with a random-number generation circuit, comprising:
   optimizing including testing random numbers output from a random-number generation circuit incorporated in an integrated circuit, while adjusting a control parameter for the random-number generation circuit, and optimizing the control parameter;
   wherein the optimizing further includes:
   adjusting the control parameter for the random-number generation circuit until a result of a first test based on NIST SP800-22 becomes OK; and
   optimizing the control parameter by obtaining a predetermined number of random numbers generated immediately after the power-on reset after each power-on reset from the random-number generation circuit, for which the adjusted control parameter is set, by repeating the power-on reset with respect to the integrated circuit for a preset number of times, executing at least one of a second test based on matched number of bits in the obtained predetermined number of random numbers and a third test based on number of 0 or 1 appearing at a same bit position in the predetermined number of random numbers, and adjusting the control parameter for the random-number generation circuit until at least one executed test result becomes OK.

2. The test method of an integrated circuit with a random-number generation circuit according to claim 1, wherein the optimizing is performed in a prototype stage of the integrated circuit having the random-number generation circuit incorporated therein, and a determining is executed at a time of performing a burn-in test in a mass production stage of the integrated circuit having the random-number generation circuit incorporated therein;
   wherein determining further includes:
   repeating power-on reset with respect to the integrated circuit for a preset number of times to obtain predetermined number of random numbers output at a predetermined timing after power-on reset from the random-number generation circuit, for which the optimized control parameter is set, every time power-on reset is performed, testing the obtained predetermined number of random numbers, and determining quality of the random-number generation circuit incorporated in the integrated circuit.

3. The test method of an integrated circuit with a random-number generation circuit according to claim 2, wherein the predetermined timing is immediately after the power-on reset.

4. The test method of an integrated circuit with a random-number generation circuit according to claim 2, wherein the test of the random numbers in the determining is performed in such a manner that at least one of a fourth test based on the obtained matched number of bits in the obtained predetermined number of random numbers and a fifth test based on the number of 0 or 1 appearing at the same bit position in the predetermined number of random numbers is executed.

5. The test method of an integrated circuit with a random-number generation circuit according to claim 4, wherein in the fourth test, for the obtained predetermined number of sets of random number sequences immediately after the power-on reset, a process of obtaining the matched number of bits by comparing arbitrary two random number sequences with each other at the same bit position is performed with respect to two random number sequences in a round-robin fashion, to obtain actual frequency distribution of the matched number of bits, to thereby determine quality of the random number based on comparison between the obtained actual frequency distribution and ideal frequency distribution.

6. The test method of an integrated circuit with a random-number generation circuit according to claim 5, wherein in the fourth test, a matched number of bits having a larger value than a center of the distribution is selected from a matched bit-number group having a frequency of 1 or less in the ideal frequency distribution, and the matched number of bits having the smallest value among the selected matched number of bits is set as a reference number of bits to thereby determine the quality of the random numbers based on the actual frequency distribution in an area equal to or larger than the reference number of bits.

7. The test method of an integrated circuit with a random-number generation circuit according to claim 4, wherein in the fifth test, for an obtained predetermined number m of sets of random number sequences immediately after the power-on reset, number of "0" or "1" appearing at the same bit position is counted, and when the counted value is not within a range equal to or larger than $(m/2-\alpha)$ and equal to or less than $(m/2+\alpha)$, where $\alpha$ denotes a predetermined fluctuation range, it is determined that the quality of the random number is poor.

8. An integrated circuit having a random-number generation circuit incorporated therein, the integrated circuit comprising:
a first terminal that switches the integrated circuit between a normal mode and a test mode;
a memory that stores random numbers generated by the random-number generation circuit in the test mode;
a second terminal, to which a control parameter for controlling the random-number generation circuit to generate random number values and storing the random number values in the memory, and a test parameter for testing quality of the generated random numbers are input in the test mode,
a controller that controls the random-number generation circuit based on the control parameter input from the second terminal in the test mode, and performs control for storing the random number values generated by the random-number generation circuit in the memory based on the test parameter input from the second terminal;
a quality determining unit that determines quality of the random-number generation circuit incorporated in the integrated circuit by performing a test of a predetermined number of random numbers stored in the memory based on the test parameter input from the second terminal; and
a third terminal that outputs a quality determination result obtained by the quality determining unit, wherein
the random number output from the random-number generation circuit at a predetermined timing after power-on reset is stored in the memory after each power-on reset, by repeating the power-on reset with respect to the integrated circuit for a preset number of times, and the quality determining unit tests the stored predetermined number of random numbers;
wherein the quality determining unit includes:
a first test unit that performs a test based on matched number of bits in the predetermined number of random numbers;
a second test unit that performs a test based on number of 0 or 1 appearing at a same bit position in the predetermined number of random numbers; and
a determining unit that determines the quality of the random-number generation circuit incorporated in the integrated circuit based on test results of the first test unit and the second test units.

9. The integrated circuit with a random-number generation circuit according to claim 8, wherein the predetermined timing is immediately after the power-on reset.

10. The integrated circuit with a random-number generation circuit according to claim 9, wherein in the first test unit, for a stored predetermined number of sets of random number sequences immediately after the power-on reset, a process of obtaining the matched number of bits by comparing arbitrary two
random number sequences with each other at the same bit position is performed with respect to two random number sequences in a round-robin fashion, to obtain actual frequency distribution of the matched number of bits, to thereby determine quality of the random number based on comparison between the obtained actual frequency distribution and ideal frequency distribution.

11. The integrated circuit with a random-number generation circuit according to claim 10, wherein in the first test unit, a matched number of bits having a larger value than a center of the distribution is selected from a matched bit-number group having a frequency of 1 or less in the ideal frequency distribution, and the matched number of bits having the smallest value among the selected matched number of bits is set as a reference number of bits to thereby determine the quality of the random numbers based on the actual frequency distribution in an area equal to or larger than the reference number of bits.

12. The integrated circuit with a random-number generation circuit according to claim 11, wherein when a difference between the actual frequency distribution and the ideal frequency distribution exceeds a preset threshold in an area equal to or larger than the reference number of bits, it is determined that the quality of the random number is poor.

13. The integrated circuit with a random-number generation circuit according to claim 11, wherein when a frequency of the matched number of bits in the actual frequency distribution exceeds a preset value in an area equal to or larger than the reference number of bits, the first test unit determines that the quality of the random number is poor.

14. The integrated circuit with a random-number generation circuit according to claim 11, wherein a predetermined number of bits larger than the reference number of bits is designated as a threshold and, when the frequency of the matched number of bits in the actual frequency distribution larger than the threshold is equal to or larger than 1, the first test unit determines that the quality of the random number is poor.

15. The integrated circuit with a random-number generation circuit according to claim 8, wherein in the second test unit, for an obtained predetermined number m of sets of random number sequences immediately after the power-on reset, number of "0" or "1" appearing at the same bit position is counted, and when the counted value is not within a range equal to or larger than (m/2−α) and equal to or less than (m/2+α), where α denotes a predetermined fluctuation range, it is determined that the quality of the random number is poor.

16. The integrated circuit with a random-number generation circuit according to claim 8, wherein the test parameter includes repeated time of the power-on reset and information specifying whether to perform a whole bit test or a partial test for the random numbers generated by the random-number generation circuit, and when it is specified to perform the partial test, information specifying a test target area of the random numbers generated by the random-number generation circuit is included in the test parameter.

17. The integrated circuit with a random-number generation circuit according to claim 8, wherein the memory is an SRAM incorporated in the integrated circuit, and power is always supplied to the SRAM in the test mode.

* * * * *